(12) United States Patent
Magai et al.

(10) Patent No.: US 8,417,038 B2
(45) Date of Patent: Apr. 9, 2013

(54) IMAGE PROCESSING APPARATUS, PROCESSING METHOD THEREFOR, AND NON-TRANSITORY COMPUTER-READABLE STORAGE MEDIUM

(75) Inventors: Koichi Magai, Tokyo (JP); Hirotaka Shiiyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 421 days.

(21) Appl. No.: 13/088,226

(22) Filed: Apr. 15, 2011

(65) Prior Publication Data

US 2011/0286670 A1   Nov. 24, 2011

(30) Foreign Application Priority Data

May 18, 2010   (JP) ................................. 2010-114707

(51) Int. Cl.
G06K 9/66 (2006.01)
G06K 9/40 (2006.01)
(52) U.S. Cl. ........................................ 382/190; 382/266
(58) Field of Classification Search .................. None
See application file for complete search history.

(56) References Cited

U.S. PATENT DOCUMENTS

| | | | | |
|---|---|---|---|---|
| 5,137,362 A * | 8/1992 | LeBeau | | 382/145 |
| 5,647,024 A * | 7/1997 | Kawauchi et al. | | 382/232 |
| 5,719,970 A * | 2/1998 | Aoki et al. | | 382/313 |
| 6,169,816 B1 * | 1/2001 | Ravkin | | 382/128 |
| 6,259,807 B1 * | 7/2001 | Ravkin | | 382/133 |
| 6,400,853 B1 | 6/2002 | Shiiyama | | |
| 6,961,466 B2 * | 11/2005 | Imagawa et al. | | 382/190 |
| 7,075,683 B1 | 7/2006 | Shiiyama | | |
| 7,187,789 B2 * | 3/2007 | Takeo | | 382/128 |
| 7,233,945 B2 | 6/2007 | Shiiyama | | |
| 7,508,998 B2 | 3/2009 | Shiiyama | | |
| 7,595,800 B2 * | 9/2009 | Kondo et al. | | 345/426 |
| 7,620,247 B2 | 11/2009 | Matsushita et al. | | |
| 7,627,178 B2 * | 12/2009 | Suzuki et al. | | 382/190 |
| 7,680,339 B2 * | 3/2010 | Tojo | | 382/199 |

(Continued)

FOREIGN PATENT DOCUMENTS

| | | | |
|---|---|---|---|
| JP | 8249349 A | 9/1996 |
| JP | 10260983 A | 9/1998 |
| JP | 2008093172 A | 4/2008 |

OTHER PUBLICATIONS

C. Harris and M.J. Stephens, "A Combined corner and edge detector," In Alvey Vision Conference, pp. 147-151, 1998.

(Continued)

Primary Examiner — Manav Seth
(74) Attorney, Agent, or Firm — Fitzpatrick, Cella, Harper & Scinto

(57) ABSTRACT

An image processing apparatus extends the edge portion of an image in a prescribed range, detects, from the image, a plurality of feature points that each indicate a setting position of a local region, sets a local region corresponding to each of the feature points in the image on which region extension has been performed, and calculates a local feature amount corresponding to each feature point based on image information in the local region.

18 Claims, 9 Drawing Sheets

U.S. PATENT DOCUMENTS

| | | |
|---|---|---|
| 7,880,936 B2 | 2/2011 | Shiiyama |
| 7,953,299 B2 | 5/2011 | Shiiyama |
| 8,026,951 B2 * | 9/2011 | Kondo et al. .............. 348/222.1 |
| 2004/0141633 A1 * | 7/2004 | Horie ............................ 382/103 |
| 2005/0018903 A1 * | 1/2005 | Miyagi et al. ................. 382/167 |
| 2007/0122037 A1 | 5/2007 | Shiiyama |
| 2008/0247675 A1 | 10/2008 | Magai et al. |
| 2008/0285855 A1 | 11/2008 | Shiiyama et al. |
| 2008/0304753 A1 | 12/2008 | Sohma et al. |
| 2009/0202124 A1 | 8/2009 | Matsuda et al. |

OTHER PUBLICATIONS

David G. Lowe, "Distinctive Image Features from Scale-Invariant Keypoints", International Journal of Computer Vision, 60, 2 (2004), pp. 91-110.

C. Schmid and R. Mohr, "Local grayvalue invariants for image retrieval", IEEE Trans. PAMI., vol. 19, No. 5, pp. 530-534, 1997.

Y. Ke and R. Sukthankar, "PCA SIFT: A More Distinctive Representation for Local Image Descriptors", Proc. CVPR, pp. 506-513, 2004.

* cited by examiner

FIG. 1
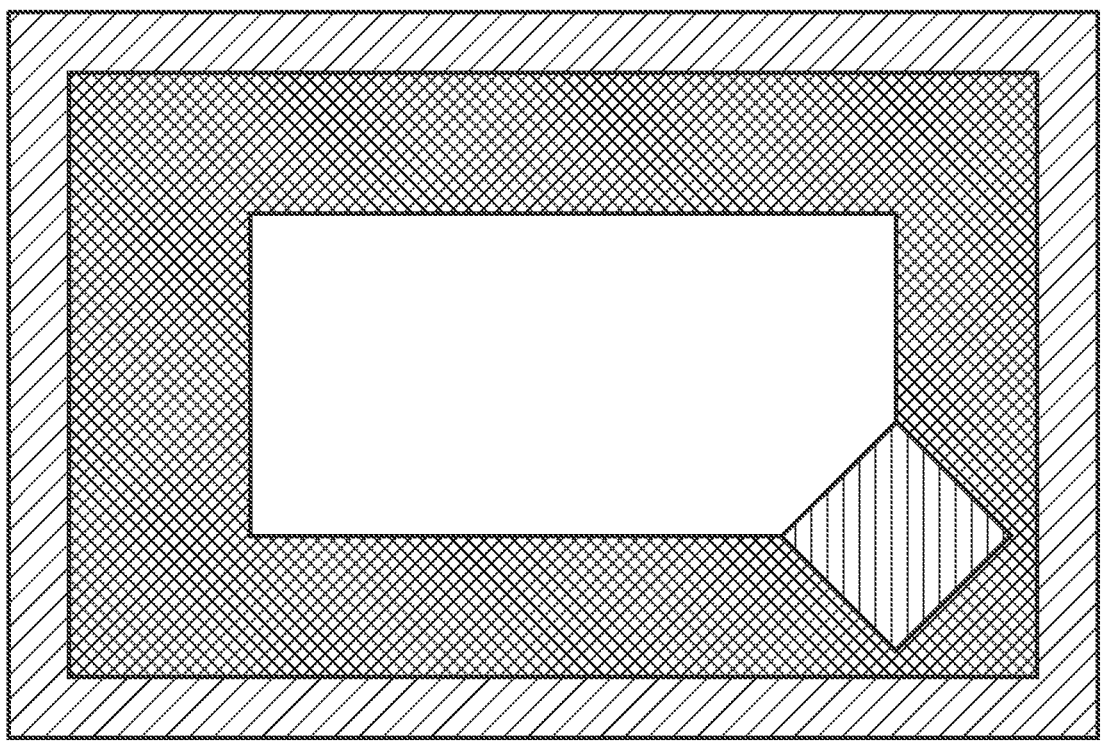
 : 11
 : 12
 : 13
 : 14

▨ : 91
☐ : 92

▨ : 91
☐ : 92

IMAGE PROCESSING APPARATUS, PROCESSING METHOD THEREFOR, AND NON-TRANSITORY COMPUTER-READABLE STORAGE MEDIUM

BACKGROUND OF THE INVENTION

1. Field of the Invention

The present invention relates to an image processing apparatus, a processing method therefor, and a non-transitory computer-readable storage medium.

2. Description of the Related Art

Various technology for searching for a similar image has been proposed. For example, a method for searching for a similar image using an overall feature (global feature amount) of an image is known. In relation to such technology, a method has been proposed in which, for example, an image is divided into a plurality of blocks, pattern matching is performed using respective representative colors of the blocks, and a similar image is searched for utilizing color position information (Japanese Patent Laid-Open No. 8-249349).

Further, a method is also known in which an image is divided into a plurality of blocks, a feature amount of each block is calculated, a label matrix is generated by giving labels to the blocks according to the feature amounts, which is used as a global feature amount, and searching is performed using that global feature amount (Japanese Patent Laid-Open No. 10-260983).

A method has also been proposed in which a similar image is searched for using a local feature amount of an image, rather than a feature amount of the entire image. In this method, first, a feature point (local feature point) is detected from an image, and a feature amount (local feature amount) for that feature point is calculated based on the feature point and image information in the vicinity thereof. Image searching is performed by matching local feature amounts of images.

With regard to a technique utilizing the above local feature amounts, a method has been proposed in which a local feature amount is defined as the amount constituted by a plurality of elements that are rotation invariant and enlargement/reduction invariant, and searching is possible even if an image is rotated or enlarged/reduced (C. Schmid and R. Mohr, "Local grayvalue invariants for image retrieval," IEEE Trans. PAMI., Vol. 19, No. 5, pp. 530-534, 1997.). Other than this, as technology for calculating a local feature amount, technology described in "David G. Lowe, 'Distinctive Image Features from Scale-Invariant Keypoints,' International Journal of Computer Vision, 60, 2 (2004), pp. 91-110" (hereinafter, referred to as Document 1) and "Y. Ke and R. Sukthankar, 'PCA-SIFT: A More Distinctive Representation for Local Image Descriptors,' Proc. CVPR, pp. 506-513, 2004" (hereinafter, referred to as Document 2) has also been proposed.

In many systems using a local feature amount, filter processing such as blur processing is performed on an input image in order to give noise resistance. Generally, filter processing is convolution processing with a filter window and an image. At this time, the filter window protrudes from the image at an edge portion of the image, and thus accurate filter processing cannot be performed.

In order to also perform processing on such an edge portion of the image similarly to a region other than the edge portion, Japanese Patent Laid-Open No. 2008-93172 describes technology for detecting a lesion candidate region based on the amount of change in a pixel value between a pixel of interest and peripheral pixels thereof with respect to an image of a body cavity, and with this technology, if the pixel of interest is at the edge of the image, the image of that edge portion is simply replicated, thereby securing the peripheral pixels of the region of interest.

When a local feature amount is calculated, first, a region (local feature amount calculation region) of a small size having a feature point in the center is set, and a local feature amount is calculated based on a pixel pattern in that region. Accordingly, at the edge portion of the image, a local feature amount calculation region may protrude from the image.

Thus, in searching using a local feature amount, fundamentally, there is often a region in which a local feature amount cannot be detected (local feature amount calculation impossible region) from the periphery of the edge of the image. This local feature amount calculation impossible region occurs due to protrusion of a filter window or a local feature amount calculation region.

Accordingly, for example, if searching utilizing a local feature amount is applied to an information leak security system, an object in the local feature amount calculation impossible region cannot be searched for, which may create a security hole. Thus, it is necessary to reduce the local feature amount calculation impossible region as much as possible.

SUMMARY OF THE INVENTION

The present invention provides technology for enabling calculation of a local feature amount even from the edge portion of an image.

According to a first aspect of the present invention there is provided an image processing apparatus for obtaining a local feature amount from an image, comprising: an extension unit configured to generate an extended image by extending an edge portion of the image in a prescribed range; a detection unit configured to detect, from the extended image, a plurality of feature points that each indicate a setting position of a local region that specifies a calculation region for the local feature amount; a calculation unit configured to, for each of the feature points in the extended image, set the local region corresponding to the feature point, and calculate a local feature amount corresponding to the feature point based on image information in the local region; an inspection unit configured to inspect the image information in each local region that has been set with respect to the extended region, and determine whether to adopt the local feature amount calculated from the local region based on the inspection result; and an obtaining unit configured to obtain each local feature amount calculated from a region other than the extended region and each local feature amount determined to be adopted by the inspection unit, as local feature amounts in the image.

According to a second aspect of the present invention there is provided an image processing apparatus for obtaining a local feature amount from an image, comprising: a detection unit configured to detect, from the image, a plurality of feature points that each indicate a setting position of a local region that specifies a calculation region for the local feature amount; an inspection unit configured to set the local region corresponding to each of the feature points in the image, and if the set local region protrudes from an edge of the image, inspect image information in the protruding local region, and determine whether to adopt the feature point corresponding to the local region that has been set with respect to the protruding region based on the inspection result; an extension unit configured to extend, in a prescribed range, an edge portion of the image in the local region that has been set with respect to the feature point that has been determined to be adopted by the inspection unit; and a calculation unit configured to calculate the local feature amount corresponding to each of the feature points based on image information in a local region that does not protrude from the edge of the image and image information in the extended local region.

According to a third aspect of the present invention there is provided an image processing apparatus for obtaining a local feature amount from an image, comprising: an inspection unit configured to inspect image information in an edge portion of the image, and determine whether to extend the edge portion of the image based on the inspection result; an extension unit configured to extend the edge portion of the image in a prescribed range if the inspection unit has determined that the edge portion is to be extended; a detection unit configured to detect, from the image, a plurality of feature points that each indicate a setting position of a local region that specifies a calculation region for the local feature amount; and a calculation unit configured to, for each of the feature points in the image, set the local region corresponding to the feature point, and calculate the local feature amount corresponding to the feature point based on image information in the local region.

According to a fourth aspect of the present invention there is provided a processing method for an image processing apparatus for obtaining a local feature amount from an image, the method comprising: generating an extended image by extending an edge portion of the image in a prescribed range; detecting, from the extended image, a plurality of feature points that each indicate a setting position of a local region that specifies a calculation region for the local feature amount; setting for each of the feature points in the extended image the local region corresponding to the feature point, and calculating a local feature amount corresponding to the feature point based on image information in the local region; inspecting the image information in each local region that has been set with respect to the extended region, and determining whether to adopt the local feature amount calculated from the local region based on the inspection result; and obtaining each local feature amount calculated from a region other than the extended region and each local feature amount determined to be adopted in the inspecting, as local feature amounts in the image.

According to a fifth aspect of the present invention there is provided A processing method for an image processing apparatus for obtaining a local feature amount from an image, the method comprising: inspecting image information in an edge portion of the image, and determining whether to extend the edge portion of the image based on the inspection result; extending the edge portion of the image in a prescribed range if it is determined that the edge portion is to be extended as a result of the determination; detecting, from the image, a plurality of feature points that each indicate a setting position of a local region that specifies a calculation region for the local feature amount; and setting for each of the feature points in the image the local region corresponding to the feature point and calculating the local feature amount corresponding to the feature point based on image information in the local region.

Further features of the present invention will be apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 1 is a diagram showing examples of a region in which a local feature amount can be calculated and a region in which it cannot be calculated.

DESCRIPTION OF THE EMBODIMENTS

Figure 2:
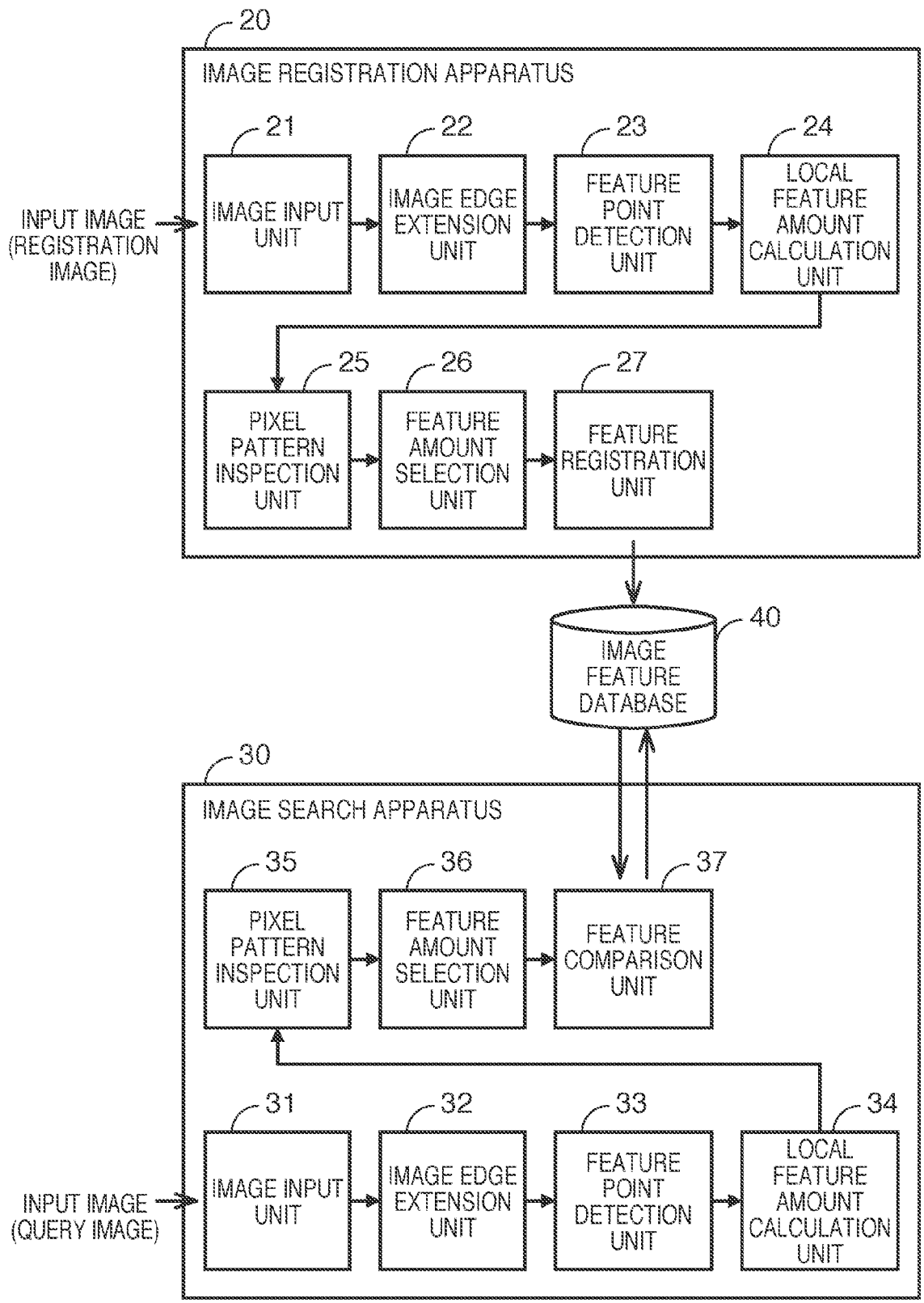
FIG. 2 is a diagram showing an example of a configuration of a search system according to an embodiment of the present invention.

Exemplary embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

A region that is ordinarily considered to be a region in which calculation of a local feature amount can be performed and a region that is ordinarily considered to be a region in which that calculation is difficult are described below with reference to FIG. 1.

Reference numeral 11 denotes a region in which it is difficult to accurately perform filter processing. Specifically, in many search systems using a local feature amount, filter processing such as blur processing is performed on an input image in order to give noise resistance. Generally, filter processing is convolution processing with a filter window and an image. At this time, the filter window protrudes from the image at an edge portion of the image, and thus accurate filter processing cannot be performed.

Reference numeral 12 denotes a region in which it is difficult to accurately calculate a local feature amount. In the calculation of a local feature amount, first, a region (local feature amount calculation region) of a small size having a feature point in the center is set. After that, a local feature amount is calculated based on image information (a pixel pattern) in the local feature amount calculation region (hereinafter, abbreviated as "local region"). At this time, a local region protrudes from an image at the edge portion of the image. Reference numeral 13 denotes a local feature amount calculation region that has been rotated 45 degrees according to a main direction for the purpose of normalization of the direction.

Reference numeral 14 denotes a region in which a local feature amount can be calculated, and if an embodiment of the present invention is not applied, a local feature amount will be detected only from this local feature amount calculation possible region (hereinafter, abbreviated as "calculation possible region") 14. Note that in the description below, the region 11 in which accurate filter processing is difficult and the region 12 in which accurate local feature amount calculation is difficult are collectively referred to as a "local feature amount calculation impossible region (hereinafter, abbreviated as "calculation impossible region")".

Embodiment 1

Here, an example of a configuration of a search system according to an embodiment of the present invention is described with reference to FIG. 2.

The search system is constituted being provided with an image registration apparatus 20, an image search apparatus 30, and an image feature database 40. The image registration apparatus 20 and the image search apparatus 30 are connected to the image feature database 40. Note that the image registration apparatus 20 and the image search apparatus 30 may be connected to each other or may not be connected to each other.

The image feature database 40 is a database that stores image features. Image features detected from input images (registration images) by the image registration apparatus 20 are registered in the image feature database 40.

The image registration apparatus 20 obtains, based on an image (registration image) to be registered in the image feature database 40, an image feature with respect to each local region in that image, and registers the results thereof in the image feature database 40.

The image search apparatus 30 obtains, based on an image (query image) to be searched for from the image feature database 40, an image feature with respect to each local region in that image, and performs an image search from the image feature database 40 based on the obtained image features.

Note that a computer is included in both the image registration apparatus 20 and the image search apparatus 30. The computers are each provided with a main control unit such as a CPU, and a storage unit such as a ROM (Read Only Memory), a RAM (Random Access Memory), or an HDD (Hard Disk Drive). Other than these, the computers may also each be provided with an input/output unit such as a button, a display, or a touch panel, a communication unit such as a network card, and the like. Note that these constituent units are connected by a bus or the like, and are controlled by the main control unit executing a program stored in the storage unit. For example, the functional configurations realized in the image registration apparatus 20 and the image search apparatus 30 are realized by the CPU reading and executing a program stored in a ROM or the like.

Here, the image registration apparatus 20 is constituted being provided with, as the functional configuration thereof, an image input unit 21, an image edge extension unit 22, a feature point detection unit 23, a local feature amount calculation unit 24, a pixel pattern inspection unit 25, a feature amount selection unit 26, and a feature registration unit 27.

The image input unit 21 inputs a registration image into the apparatus (image registration apparatus 20). After inputting the registration image into the apparatus, the image input unit 21 generates a luminance-component image from that image. Then, the image input unit 21 reduces the luminance-component image step by step at a reduction ratio determined in advance, and generates a reduced image sequence.

Figure 3:
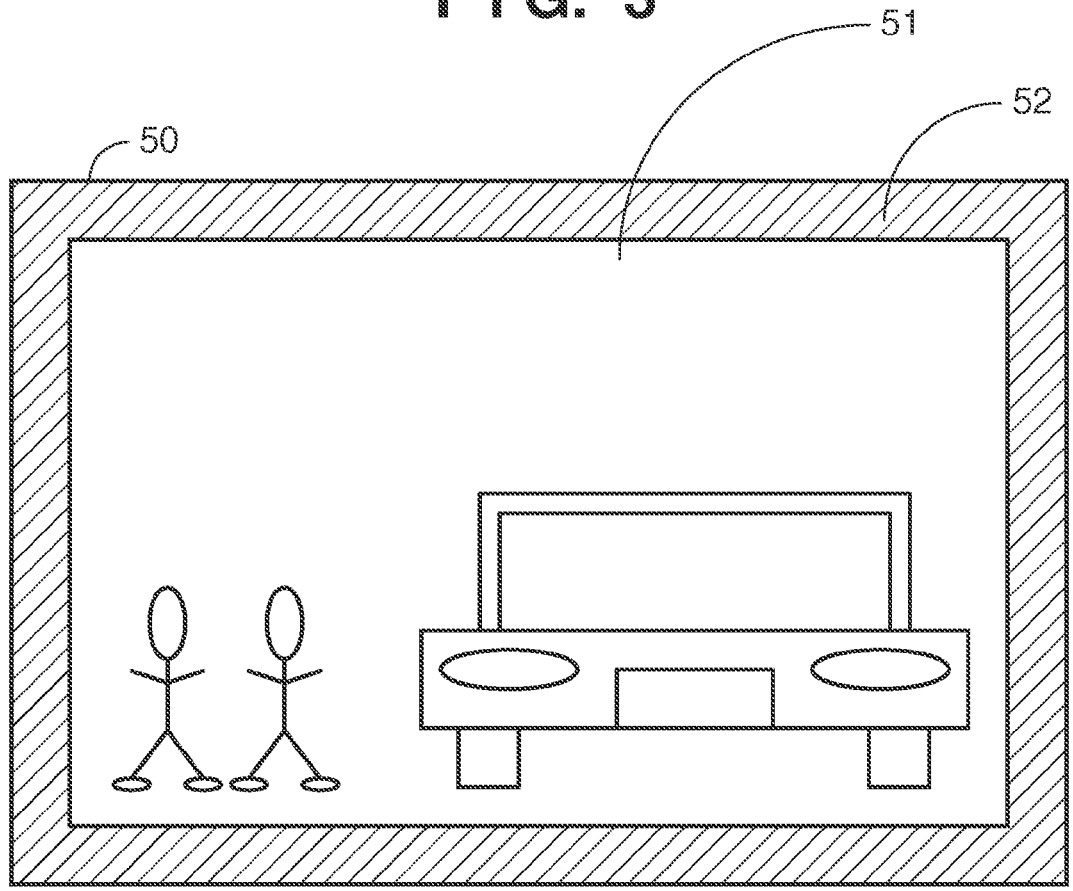
FIG. 3 is a diagram showing a conceptual diagram of processing for extending an edge of an image.

The image edge extension unit 22 implements extension processing for extending an image edge on each reduced image in the reduced image sequence generated by the image input unit 21. The extension width is the same as the width of a calculation impossible region calculated in advance, for example. FIG. 3 shows a conceptual diagram of extension processing for extending the edge of an image. Reference numeral 51 denotes a reduced image, and reference numeral 52 denotes an extended portion of the image edge processed by the image edge extension unit 22. As a result of the extension of the image edge, an extended image 50 is generated with respect to each reduced image in the reduced image sequence.

Here, using the image edge as a border, the generation of an extended image according to the present embodiment is performed by replicating pixel values of pixels in a prescribed range from the edge. Note that an image is extended by calculation in the present embodiment, rather than actually generating an extended image. For example, as a result of replicating a point $P(i, j)$ positioned at the left edge of an image using the left edge side as a border, a pixel $P'(-i, j)$ having the same value as that of the point $P(i, j)$ is generated at the position of coordinates $(-i, j)$. At this time, an access to the point P' is equivalent to an access to coordinates $(|-i|, j)$. Note that although the case where an image is extended by calculation has been described here, a configuration may of course be adopted in which a new image obtained by extending the edge of an image is generated.

The feature point detection unit 23 detects local feature points from each extended image. A feature point indicates a setting position of a local region. In the detection of feature points, blur processing is performed on the extended image 50, so as to generate a blurred image. Then, feature points are detected from each generated blurred image. Note that, for example, Harris operator may be used for the detection of feature points (see C. Harris and M. J. Stephens, "A Combined corner and edge detector," In Alvey Vision Conference, pages 147-151, 1988).

The local feature amount calculation unit 24 sets, with respect to each feature point detected by the feature point detection unit 23, a local region (local feature amount calculation region) using pixel values in a peripheral region (prescribed range from a feature point) including that feature point. Then, a local feature amount is calculated using the pixel values in that region. A local region is a region that specifies a region for calculating a local feature amount, as described above.

The following is a more detailed description of how a local feature amount is calculated. In this calculation, first, the local feature amount calculation unit 24 examines the luminance gradient in the periphery of a feature point, and determines the main direction. It is sufficient to use, for example, the method described in Document 1 described above to determine the main direction. Note that it is possible to determine the main direction using a method other than this method (in Document 1), if the influence of noise can be made less likely to be exerted.

After determining the main direction, the local feature amount calculation unit 24 rotates a local region about the feature point according to the main direction. In this way, the local region is normalized with respect to the direction. Then, a local feature amount is calculated after this normalization. Accordingly, the local feature amount to be calculated can have invariability with respect to the rotation of an image. Note that it is sufficient to use, for example, a method described in Document 2 described above to calculate a local feature amount. Note that it is possible to calculate a local feature amount using a method other than this (in Document 2), if the influence of noise can be made less likely to be exerted. In the following, a local region in the description is assumed to be completely normalized with respect to all the directions.

The pixel pattern inspection unit 25 specifies extension pixels (pixels belonging to an extended portion) from among pixels in the local region used for calculation of a local feature amount, and calculates variance based on the pixel values of the extension pixels. Then, the pixel pattern inspection unit 25 compares this variance value with a prescribed threshold value, and outputs an inspection result based on the comparison. More specifically, if the variance value is less than or equal to the prescribed threshold value, "having uniformity" is output as an inspection result assuming that a pixel pattern of the extension pixels has uniformity, whereas if the value exceeds the threshold value, "having no uniformity" is output as an inspection result. In the present embodiment, it is sufficient to set the prescribed threshold value to about 200 to 600, for example.

The feature amount selection unit 26 sorts out local feature amounts, based on the inspection result obtained by the pixel pattern inspection unit 25. More specifically, a local feature amount determined as having uniformity based on the inspection result obtained by the pixel pattern inspection unit 25 is obtained (kept), whereas a local feature amount determined as having no uniformity based on the inspection result obtained by the pixel pattern inspection unit 25 is not adopted and discarded.

The feature registration unit 27 registers all the local feature amounts that were not discarded through the processing performed by the feature amount selection unit 26, in the image feature database 40. In this registration, a position (coordinates) in an image and the reduction step number are registered together with a local feature amount in association therewith.

Next, the configuration of the image search apparatus 30 is described. The image search apparatus 30 is constituted being provided with, as the functional configuration thereof, an image input unit 31, an image edge extension unit 32, a feature point detection unit 33, a local feature amount calculation unit 34, a pixel pattern inspection unit 35, a feature amount selection unit 36, and a feature comparison unit 37. Note that the constituent elements denoted by numerals 31 to 36 in the image search apparatus 30 respectively carry out the same functions as those of the constituent elements denoted by numerals 21 to 26 in the image registration apparatus 20, and thus a description thereof is omitted here.

The feature comparison unit 37 compares an image feature obtained by performing the processing described above with a plurality of image features stored in the image feature database 40, and searches for an image feature that matches the obtained image feature from the image feature database 40.

This completes the description of the configuration of the apparatuses that constitute the search system. Note that the functional constituent elements provided in these apparatuses (the image registration apparatus 20 and the image search apparatus 30) do not necessarily need to be realized as shown in the drawing, and it is sufficient that all or some of the constituent elements are realized in either of the apparatus in the system.

Figure 4:
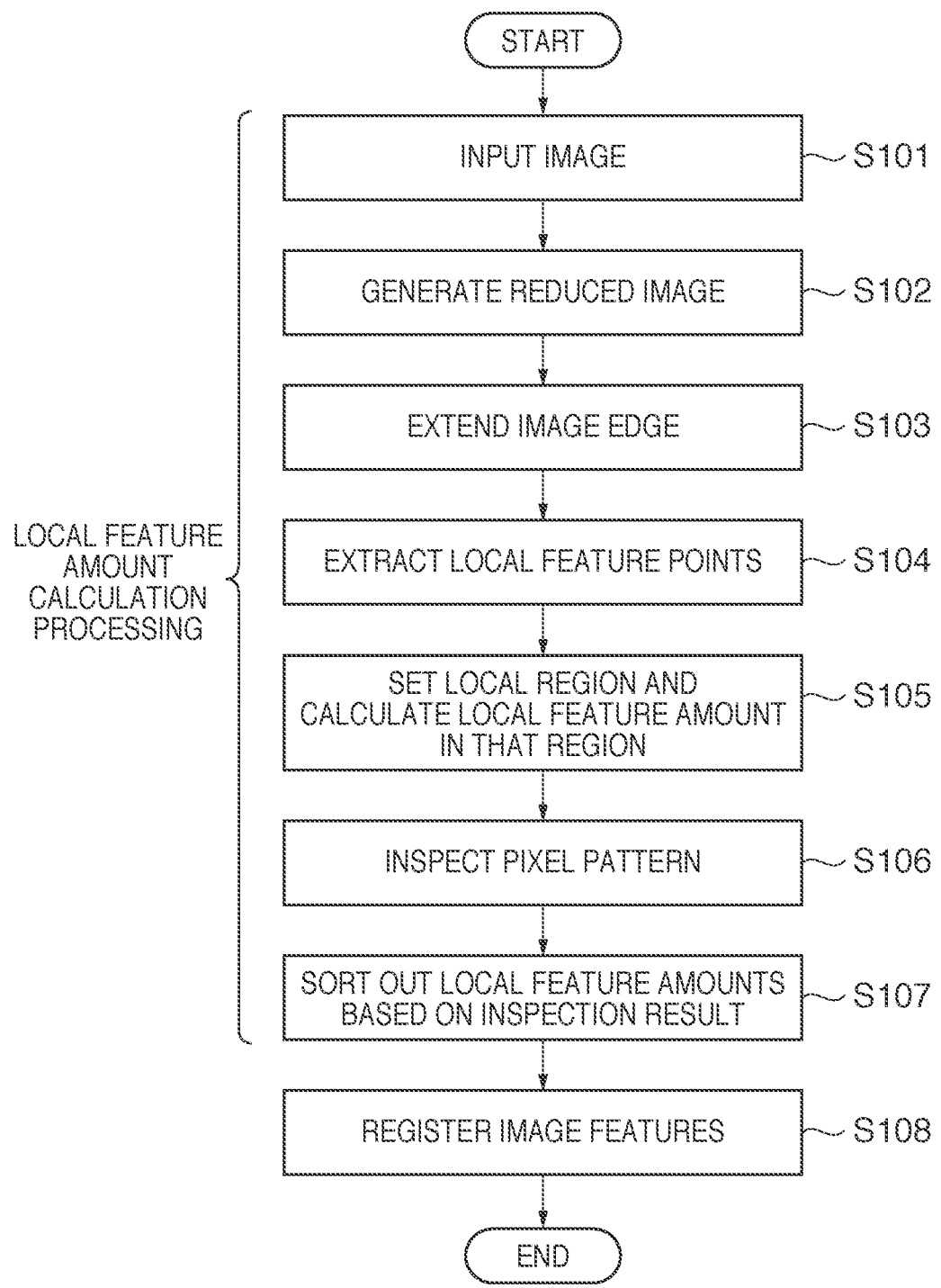
FIG. 4 is a flowchart showing an example of a flow of image registration processing in an image registration apparatus 20 shown in FIG. 2.

Next, an example of the flow of image registration processing in the image registration apparatus 20 shown in FIG. 2 is described with reference to FIG. 4.

First, in the image registration apparatus 20, the image input unit 21 inputs an input image (registration image) in the apparatus (the image registration apparatus 20) (S101), generates a luminance-component image from that image, and generates a reduced image sequence based on that luminance-component image (S102).

Next, in the image registration apparatus 20, the image edge extension unit 22 performs processing for extending the image edge on each reduced image in the reduced image sequence (S103). Specifically, the image edge extension unit 22 generates an extended image (see FIG. 3) corresponding to each reduced image.

Upon the end of the generation of extended images, in the image registration apparatus 20, the feature point detection unit 23 detects local feature points from the extended images (S104). Then, the local feature amount calculation unit 24 sets local regions respectively corresponding to the feature points detected by the feature point detection unit 23. Upon the end of the setting of the local regions, the feature point detection unit 23 calculates local feature amounts using pixel values in the regions (S105).

Upon the end of the calculation of the local feature amounts, in the image registration apparatus 20, the pixel pattern inspection unit 25 inspects a pixel pattern in a local region calculated from a region that was a calculation impossible region before image edge extension (S106). Specifically, pixels belonging to an extended portion are specified as extension pixels from among pixels in a local region, and variance of pixel values is calculated based on the pixel values of the extension pixels. Then, this variance value is compared with the prescribed threshold value, and it is determined whether or not the pixel pattern of the extension pixels has uniformity (or no uniformity) based on the comparison result.

Subsequently, in the image registration apparatus 20, the feature amount selection unit 26 sorts out local feature amounts based on the inspection results (S107). In other words, a local feature amount determined as having uniformity is kept, and a local feature amount determined as having no uniformity is discarded. After that, in the image registration apparatus 20, the feature registration unit 27 registers all the local feature amounts that were not discarded through the sort-out processing performed by the feature amount selection unit 26 in the image feature database 40 in association with the position (coordinates) in an image and the reduction step number (S108).

Next, an example of a flow of image feature search processing in the image search apparatus 30 shown in FIG. 2 is described. Here, after performing the same local feature amount calculation processing as that performed by the image registration apparatus 20, the image search apparatus 30 searches for an image feature based on the result. Accordingly, the local feature amount calculation processing (S101 to S107) is the same processing, and thus the processing that differs is described below with reference to FIG. 4. The processing in S108 is the difference.

Specifically, in the image search apparatus 30, after performing local feature amount calculation processing (processing in S101 to S107) as with the case of the image registration apparatus 20, the feature comparison unit 37 performs search processing based on the result of the processing (S108). The feature comparison unit 37 compares all the local feature amounts determined as having uniformity with local feature amounts of registration images stored (registered) in the image feature database 40. Then, the search result is output.

Although the above is the description of the flow of processing in the image registration apparatus 20 and the image search apparatus 30, the above description is just an example, and the embodiment may be changed as appropriate and implemented.

Although the above description has been given using, for example, the case where local feature amounts determined as having no uniformity by the pixel pattern inspection units 25 and 35 are not adopted and discarded as an example, the present invention is not limited to such processing. For example, in the case where it has been determined that a local feature amount is not to be adopted, the method for extending the edge portion of an image in a local region from which the local feature amount is calculated is changed, and extension processing is implemented, and thereafter detection of feature points and calculation of local feature amounts are again implemented. Then, an inspection may be implemented on the calculated local feature amount, and whether or not to adopt a local feature amount calculated from the edge portion of the image may be again determined.

Although the above description has been given using the case where the pixel pattern inspection units 25 and 35 determine the presence/absence of uniformity using pixel values of extension pixels as an example, the present invention is not limited to such processing. For example, the presence/absence of uniformity may be determined using arbitrary pixel values in a local region, rather than pixel values of extension pixels. For example, all the pixel values, randomly selected pixel values, or pixel values belonging to a predetermined partial region in a local region may be used as arbitrary pixel values.

Although the above description has been given using the case where local feature amounts are calculated before inspection processing performed by the pixel pattern inspection units 25 and 35 starts as an example, a change may be made so as not to perform such processing on feature points that exist in a calculation impossible region. For example, a configuration is possible in which processing performed by the local feature amount calculation units 24 and 34 is performed up to the normalization of the direction of a local region, and a local feature amount is calculated with respect to only the local region that was not discarded by the feature amount selection units 26 and 36.

As described above, according to Embodiment 1, local feature amounts are calculated after extending the edge of an image, and thus feature points can also be detected from a region (calculation impossible region) for which calculation has been conventionally difficult or impossible, and local feature amounts can also be calculated therefrom.

Further, according to Embodiment 1, variance of pixel values of pixels belonging to the extended portion among pixels in a region used for calculation of a local feature amount is calculated, and if the variance value exceeds the prescribed threshold value, that local feature amount is discarded. Consequently, useful local features can also be detected from the vicinity of the edge of an image, and thus even in the case where an object to be searched for exists in the vicinity of the image edge, that object can be searched for.

Embodiment 2

Next, Embodiment 2 is described. In Embodiment 2, feature points are detected before extending the edge portion of an image, and if a local region that has been set for the feature point protrudes from the image edge, it is determined whether or not the protruding region can be extended. Then, the edge of the image is extended only when it is determined that the region can be extended, which will now be described.

Figure 5:
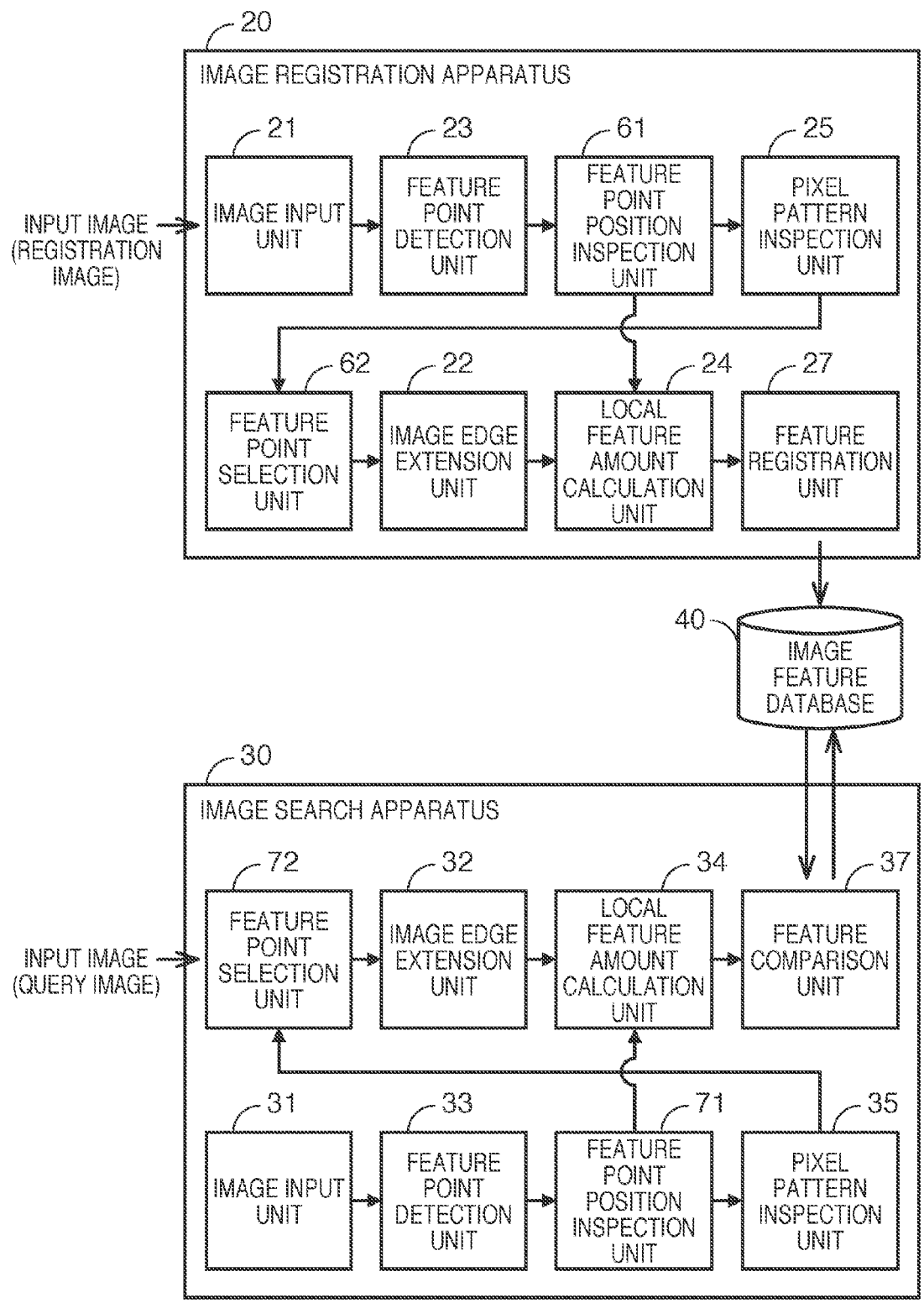
FIG. 5 is a diagram showing an example of a configuration of a search system according to Embodiment 2.

FIG. 5 is a diagram showing an example of a configuration of a search system according to Embodiment 2. Note that the same numerals are given to the constituent elements that achieve the same functions as those in Embodiment 1, and a description thereof may be omitted.

Here, the image registration apparatus 20 is provided with the image input unit 21, the feature point detection unit 23, a feature point position inspection unit 61, the pixel pattern inspection unit 25, a feature point selection unit 62, the image edge extension unit 22, the local feature amount calculation unit 24, and the feature registration unit 27. Thus, the order of processing performed by the constituent elements has been switched, and the feature point position inspection unit 61 and the feature point selection unit 62 are newly provided, which differs from the configuration in Embodiment 1.

The feature point detection unit 23 detects local feature points from each reduced image in a reduced image sequence processed by the image input unit 21, rather than from an extended image. The feature point position inspection unit 61 detects the position of each feature point, outputs feature points outside a calculation impossible region (other than that region) as a result of the position detection to the local feature amount calculation unit 24, and outputs feature points in a calculation impossible region to the pixel pattern inspection unit 25.

The pixel pattern inspection unit 25 sets local regions respectively corresponding to the feature points received as input from the feature point position inspection unit 61. Then, variance is calculated based on the pixel values of pixels that are in the regions and do not protrude from the edge of the reduced images. In this way, an inspection result is output based on the relationship between the variance value and the prescribed threshold value, which is the same as in the above description.

The feature point selection unit 62 sorts out feature points (local regions) based on the inspection result obtained by the pixel pattern inspection unit 25. If a local region protrudes from the edge of the reduced image, the image edge extension unit 22 extends the reduced image in the protruded region. Note that a method for extending an image may be implemented by replicating pixel values of pixels in a prescribed range from the image edge using that edge as a border, as with the case of Embodiment 1.

The local feature amount calculation unit 24 calculates local feature amounts respectively corresponding to the feature points input from the feature point position inspection unit 61 and the image edge extension unit 22. Note that a local region is not set if a feature point is input from the feature point position inspection unit 61, and thus the local feature amount calculation unit 24 sets local regions respectively corresponding to the feature points, and thereafter calculates local feature amounts.

The feature registration unit 27 registers, in the image feature database 40, a position (coordinates) in an image and the reduction step number together with a local feature amount in association therewith, as with the case of Embodiment 1.

This completes the description of the configurations of the image registration apparatus 20 according to Embodiment 2. Note that the image search apparatus 30 according to Embodiment 2 has a configuration in which the same constituent elements as those added to the image registration apparatus 20 have been added, for instance, and thus a description thereof is omitted here to prevent a redundant description.

Figure 6:
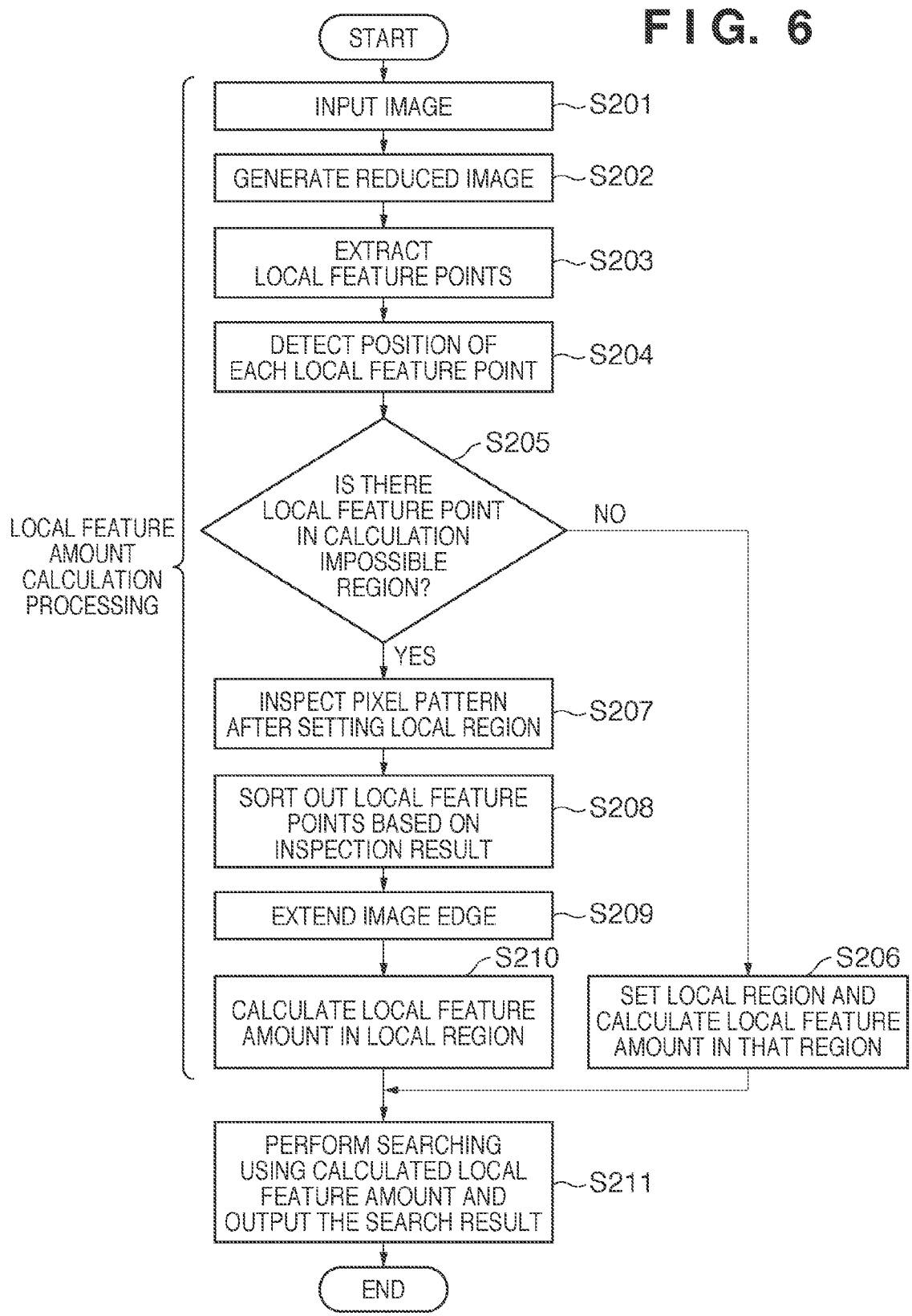
FIG. 6 is a flowchart showing an example of a flow of image search processing in an image search apparatus 30 according to Embodiment 2.

Next, the flow of image search processing in the image search apparatus 30 is described with reference to FIG. 6, as an example of a description of the flow of processing performed by the apparatus according to Embodiment 2.

First, in the image search apparatus 30, the image input unit 31 inputs an input image (query image) into the apparatus (the image search apparatus 30) (S201), generates a luminance-component image from that image, and generates a reduced image sequence based on the luminance-component image (S202).

Next, in the image search apparatus 30, the feature point detection unit 33 detects feature points from the reduced images (S203), and a feature point position inspection unit 71 detects the position of each feature point (S204). More specifically, the feature point detection unit 33 detects the position of each feature point, outputs feature points outside a calculation impossible region as a result of the position detection to the local feature amount calculation unit 34 (NO in S205), and outputs feature points in the calculation impossible region to the pixel pattern inspection unit 35 (YES in S205).

Here, the local feature amount calculation unit 34 that has received the input of feature points from the feature point position inspection unit 71 sets a local region with respect to each of the feature points received as input, and calculates a local feature amount using a pixel pattern in the local region (S206). After that, the image search apparatus 30 proceeds to processing in step S211.

On the other hand, the pixel pattern inspection unit 35 that has received the input of feature points from the feature point position inspection unit 71 first sets a local region with respect to each of the feature points. Then, variance is calculated based on the pixel values of pixels that are in that region and do not protrude from the edge of the reduced image. After that, as with the case of Embodiment 1, this variance value is compared with the prescribed threshold value, and an inspection result is output based on that comparison. More specifically, if the variance value is less than or equal to the prescribed threshold value, a pixel pattern is considered to be "having uniformity", which is output as the inspection result, and if the variance value exceeds the threshold value, "having no uniformity" is output as an inspection result (S207).

Subsequently, in the image search apparatus 30, a feature point selection unit 72 sorts out feature points (local regions) based on the inspection result (S208). Specifically, a feature point (local region) determined as having uniformity is kept, and a feature point (local region) determined as having no uniformity is discarded.

Upon the end of sorting out, in the image search apparatus 30, the image edge extension unit 32 determines whether or not a region in each local region kept after being sorted out protrudes from the edge of a reduced image. As a result of the determination, if the region does not protrude, processing is not performed, whereas if the region protrudes, the reduced image in the protruded portion is extended (S209).

After that, in the image search apparatus 30, the local feature amount calculation unit 34 calculates a local feature amount using a pixel pattern in each local region (S210). Upon the end of calculation of local feature amounts, in the image search apparatus 30, the feature comparison unit 37 compares the calculated local feature amounts with the local feature amounts of registration images stored in the image feature database 40. Then, the result is output as a search result (S211).

Note that in the image registration processing in the image registration apparatus 20 according to Embodiment 2, the same processing as the processing described above except the processing in S211 is performed, and thus a description thereof is omitted, here. In other words, in the case of the image registration apparatus 20, in the processing in S211, processing for registering a local feature amount is performed, instead of performing search based on local feature amounts.

As described above, according to Embodiment 2, feature points are detected before extending the edge portion of an image, and among the detected feature points, a local region is set with respect to each feature point positioned in a calculation possible region, and local feature amounts respectively corresponding to the regions are calculated. On the other hand, with respect to feature points positioned in a calculation impossible region, if there are regions that protrude from the edge portion of an image when local regions are set, the regions are extended, and thereafter local feature amounts respectively corresponding to the regions are calculated. Accordingly, in addition to the effect of Embodiment 1, the load of calculation processing can be further reduced.

Embodiment 3

Next, Embodiment 3 is described. In Embodiment 3, the case where the extendability of a calculation impossible region is inspected, and the edge of an image is extended only when it is determined that the region can be extended is described.

Figure 7:
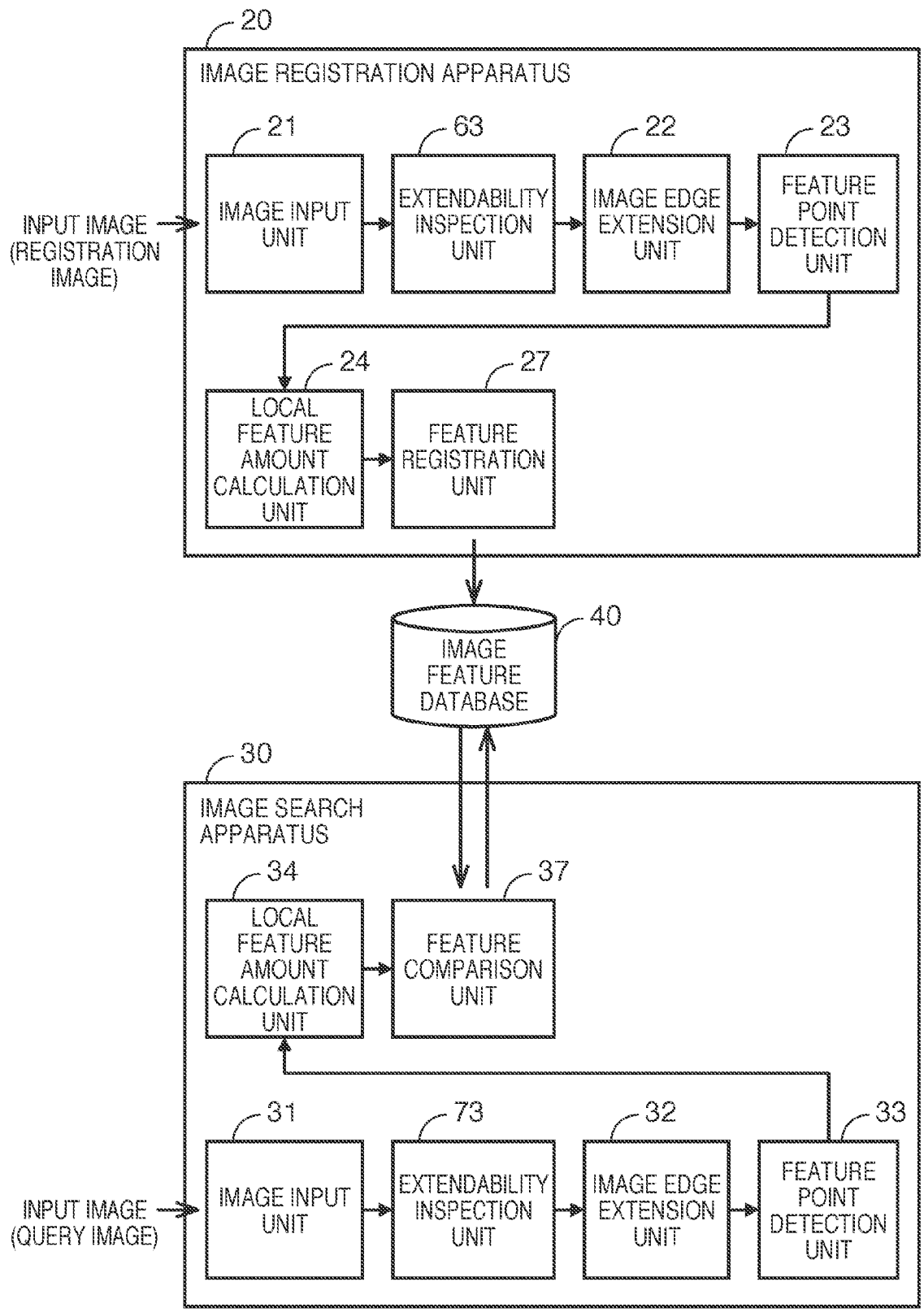
FIG. 7 is a diagram showing an example of a configuration of a search system according to Embodiment 3.

FIG. 7 is a diagram showing an example of a configuration of a search system according to Embodiment 3. Note that the same numerals are given to the constituent elements that achieve the same functions as those in Embodiment 1, and a description thereof may be omitted.

Here, the image registration apparatus 20 is provided with the image input unit 21, an extendability inspection unit 63, the image edge extension unit 22, the feature point detection unit 23, the local feature amount calculation unit 24, and the feature registration unit 27. Thus, some portions of the configuration are removed, and the extendability inspection unit 63 is newly provided, which differs from the configurations of Embodiment 1.

The extendability inspection unit 63 calculates variance based on all the pixel values in a calculation impossible region in each reduced image in the reduced image sequence processed by the image input unit 21. Then, the extendability inspection unit 63 compares this variance value with the prescribed threshold value, and outputs an inspection result based on the comparison. More specifically, if the variance value is less than or equal to the prescribed threshold value, a pixel pattern is considered to have uniformity, and "having uniformity" is output as an inspection result, whereas if the variance value exceeds the threshold value, "having no uniformity" is output as an inspection result.

The image edge extension unit 22 creates an extended image (extended reduced image) by extending the image edge of a reduced image that has been determined by the extendability inspection unit 63 as having uniformity.

This completes the description of the configuration of the image registration apparatus 20 according to Embodiment 3. Note that the image search apparatus 30 according to Embodiment 3 has a configuration in which the same constituent element as that added to the image registration apparatus 20 has been added, for instance, and thus a description thereof is omitted here to prevent a redundant description.

Figure 8:
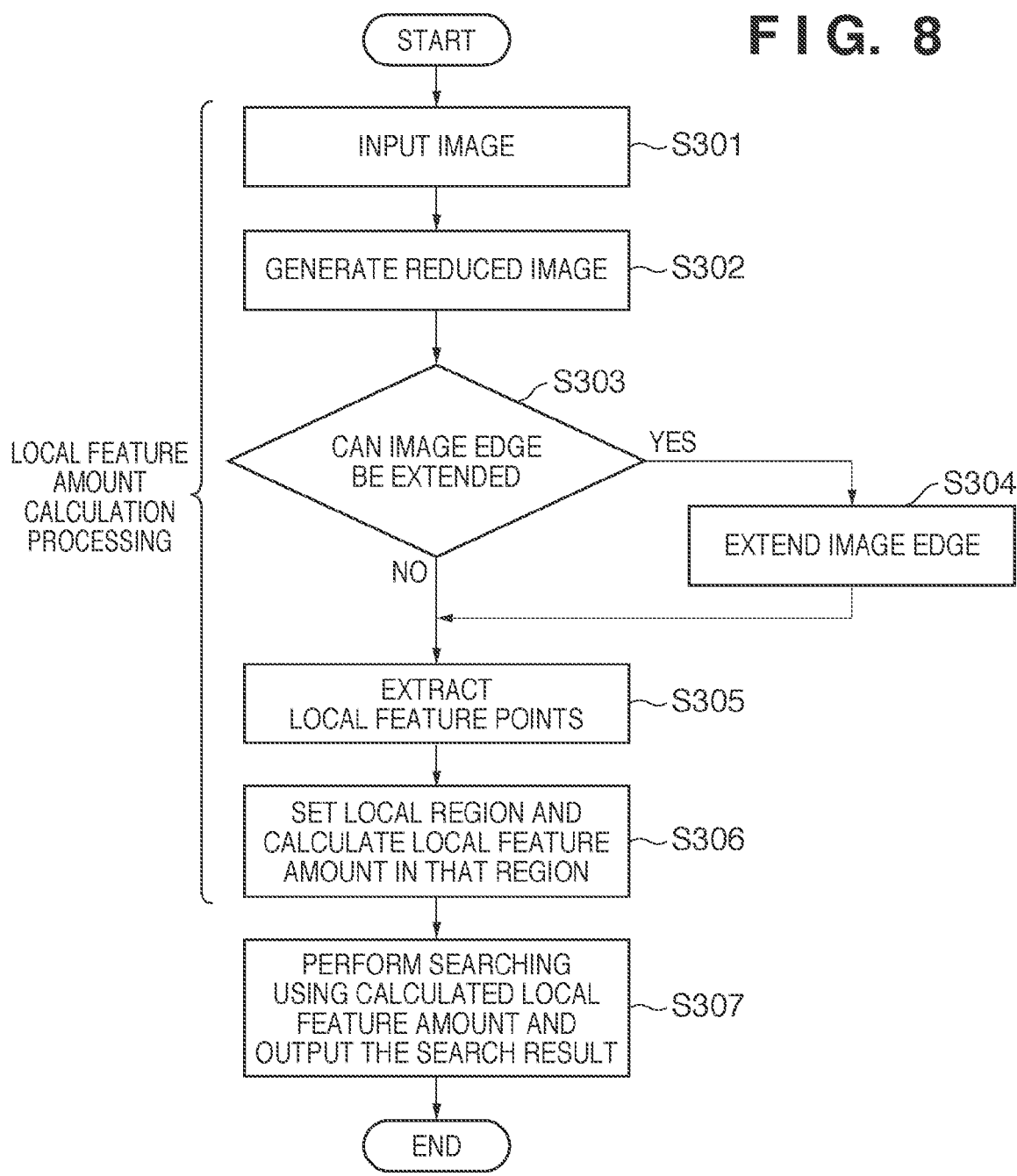
FIG. 8 is a flowchart showing an example of a flow of image search processing in the image search apparatus 30 according to Embodiment 3.

Next, the flow of image search processing in the image search apparatus 30 is described with reference to FIG. 8, as an example of a description of the flow of processing performed by the apparatus according to Embodiment 3.

First, in the image search apparatus 30, the image input unit 31 inputs an input image (registration image) into the apparatus (the image search apparatus 30) (S301), generates a luminance-component image from that image, and generates a reduced image sequence based on the luminance-component image (S302).

Next, in the image search apparatus 30, an extendability inspection unit 73 calculates variance based on all the pixel values in a calculation impossible region in each reduced image in the reduced image sequence. Then, the extendability inspection unit 73 compares this variance value with a prescribed threshold value, and outputs an inspection result based on that comparison. More specifically, if the variance value is less than or equal to the prescribed threshold value, a pixel pattern is considered to have uniformity, and "having uniformity" is output as an inspection result, whereas if the variance value exceeds the threshold value, "having no uniformity" is output as an inspection result.

Here, in the image search apparatus 30, if it is determined that the pattern has uniformity (YES in S303), the image edge extension unit 32 extends the image edge of a reduced image, and creates an extended image (S304). Note that if it is determined that the pattern has no uniformity (NO in S303), processing for extending the image edge is not performed.

After that, in the image search apparatus 30, the feature point detection unit 33 detects local feature points from each extended image (or reduced image) (S305). Then, the local feature amount calculation unit 34 sets, with respect to each feature point detected by the feature point detection unit 33, a local region using pixel values in the peripheral region thereof. Upon the end of the setting of a local region, the feature point detection unit 33 calculates a local feature amount using the pixel values in that region (S306).

After that, in the image search apparatus 30, the feature comparison unit 37 compares the calculated local feature amounts with the local feature amounts of registration images stored in the image feature database 40. Then, the result is output as search results (S307).

Note that in the image registration processing in the image registration apparatus 20 according to Embodiment 3, the same processing as the processing described above except the processing in S307 is performed, and thus a description thereof is omitted here. In other words, in the case of the image registration apparatus 20, in the processing in S307, processing for registering local feature amounts is performed instead of performing a search based on local feature amounts.

Although the above is the description of the flow of the processing in the image registration apparatus 20 and the image search apparatus 30 according to Embodiment 3, the above description is just an example, and the embodiment may be changed as appropriate and implemented.

Figure 9A:
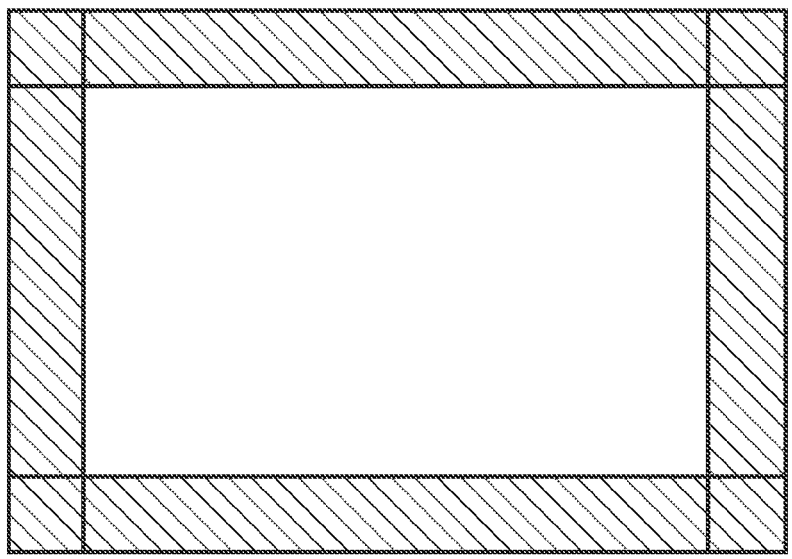
FIGS. 9A and 9B are diagrams showing examples of modified examples of Embodiment 3.
Figure 9B:
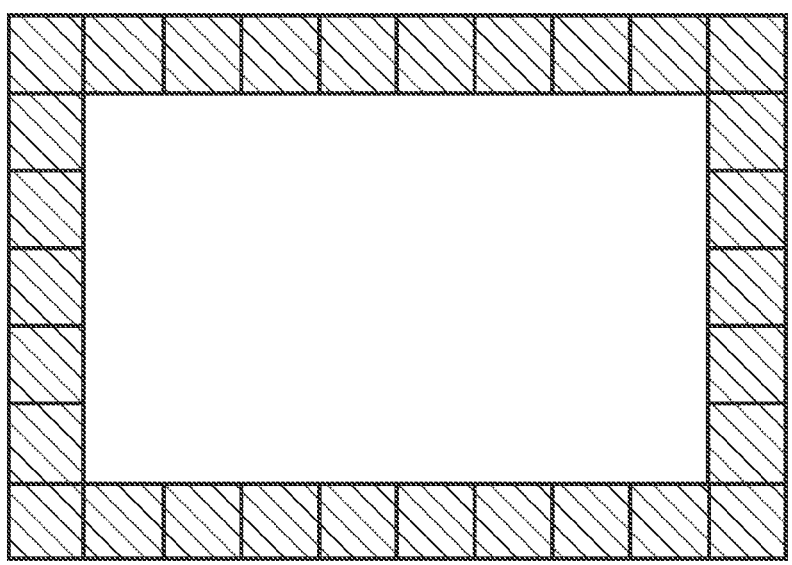

Although the above description of Embodiment 3 has been given using, for example, the case where the extendability inspection units 63 and 73 determine the presence/absence of uniformity using all the pixel values in a calculation impossible region in each reduced image as an example, the present invention is not limited to such processing. A configuration may be adopted in which uniformity of a pixel pattern in a calculation impossible region is determined for each side, as shown in FIG. 9A, for example. Further, a configuration may be adopted in which a calculation impossible region is divided into a plurality of blocks in accordance with a prescribed rule, and uniformity of a pixel pattern is determined for each block, as shown in FIG. 9B, for example. Note that numeral 92 in FIGS. 9A and 9B denotes a local feature amount calculation possible region (calculation possible region), and numeral 91 denotes a local feature amount calculation impossible region (calculation impossible region).

As described above, according to Embodiment 3, the extendability of a calculation impossible region is inspected, and the edge of an image is extended only in the case where it is determined that the region can be extended. Accordingly, in addition to the effect of Embodiment 2, the load of calculation processing can be further reduced even if a pixel pattern in a calculation impossible region is complicated.

Although the above are examples of typical embodiments of the present invention, the present invention is not limited to the embodiments described above and shown in the drawings, and can be modified as appropriate within the range where the essential points thereof are not modified, and implemented. Here, some modified examples are described.

Modified Embodiment 1

Although Embodiments 1 to 3 have been described using, for example, the case where variance of pixel values is calculated, and the presence/absence of uniformity in a pixel pattern of extension pixels is determined based on the variance value as an example, the present invention is not limited to this. For example, a configuration may be adopted in which the presence/absence of uniformity is determined based on standard deviation, rather than a variance value. Further, for example, a configuration may be adopted in which frequency conversion is performed on pixel values, and the presence/absence of uniformity is determined with reference to the coefficient obtained after the frequency conversion. In this case, uniformity determination is performed based on whether or not the value of the coefficient corresponding to a prescribed frequency is less than or equal to a threshold value, for example.

Modified Embodiment 2

Further, a configuration may be adopted in which the presence/absence of periodicity in a pixel pattern is determined, rather than determining the presence/absence of uniformity. In this case, if it is determined that the pattern has periodicity, it is determined that the edge of an image can be extended.

As the method for determining the presence/absence of periodicity, for example, a local region of a prescribed size is set so as to be in contact with the image edge and such that the included local region is the largest. After that, the autocorrelation of the local region is calculated, and it is determined that the pattern has periodicity if the largest value exceeds a prescribed threshold value. Alternatively, frequency conversion is performed on a local region, and if the ratio between the largest coefficient value and the second largest coefficient value is 2 or more, it may be determined that the pattern has periodicity. Note that it is sufficient to determine the presence/absence of periodicity, and the present invention is not limited to such a determination method. For example, a configuration may be adopted in which the presence/absence of periodicity is determined based on the correlation with a template. Specifically, a template having a periodical pixel pattern is prepared in advance. Then, a local region of a prescribed size is set so as to be in contact with the image edge and such that the included local region is the largest. A correlation value between the local region and the template is calculated, and if the correlation value exceeds a prescribed threshold value, it is determined that the pattern has periodicity.

Modified Embodiment 3

A configuration may be adopted in which the presence/absence of randomness in a pixel pattern is determined, rather than determining the presence/absence of uniformity. In this case, if it is determined that a pattern has randomness, it is determined that the edge of an image can be extended. As a method for determining the presence/absence of the randomness, for example, a local region of a prescribed size is set so as to be in contact with the image edge and such that the included local region is the largest, and frequency conversion is performed on the local region. After that, a prescribed number of coefficients are selected using a random number, and the average of the coefficient values is calculated, and this is performed twice so as to calculate a first average value and a second average value. If the ratio between the first and second average values is a value close to 1 (if it is a value in a prescribed range from 1), it is determined that the pattern is random. Alternatively, a local region of a prescribed size is set so as to be in contact with the image edge and such that the included local region is the largest. Then, a gradient direction histogram is generated using pixel values in the local region. Next, if the difference or ratio between the largest and smallest values of the gradient direction histogram is less than or equal to a threshold value, it may be determined that the pattern is random. Note that it is sufficient that the presence/ absence of the randomness can be determined, and a determination does not necessarily need to be performed using such a method.

Modified Embodiment 4

A configuration may be adopted in which it is determined whether or not a pixel pattern is a part of gradation, rather than determining the presence/absence of uniformity. In this case, if it is determined that the pattern is a part of gradation, it is determined that the edge of an image can be extended. As a method for determining whether or not a pattern is a part of gradation, for example, a pixel gradient direction histogram is generated, and if a single peak appears in a specific direction bin of the gradient direction histogram, it may be determined that the pattern is a part of gradation.

Further, it may be determined that a pattern is a part of gradation using frequency conversion. For example, a local region of a prescribed size is set so as to be in contact with the image edge and such that the included local region is the largest, and frequency conversion is performed on the local region. Then, the coefficient obtained after frequency conversion is checked, and it may be determined whether or not a pattern is a part of gradation based on whether or not a prescribed frequency band has a peak. Note that it is sufficient that whether or not a pattern is a part of gradation can be determined, and a determination does not necessarily need to be performed using such a method.

Modified Embodiment 5

A configuration may be adopted in which extendability is determined in consideration of other factors, rather than determining whether or not the edge of an image can be extended based only on the presence/absence of uniformity. For example, a configuration is possible in which the uniformity, periodicity, and randomness of a pixel pattern, and whether or not a pixel pattern is a part of gradation are each numerically expressed, and it is determined that the edge of an image can be extended if the weighted average of the values exceeds a prescribed threshold value.

Modified Embodiment 6

In the above description, although the case where an image is extended by replicating pixel values of pixels in a predetermined range from the image edge using that edge as a border has been described, the present invention is not limited to this.

Here, some methods for extending an image are listed.

1) A configuration may be adopted in which the edge portion of an image is extended by repeating a pixel pattern detected from the vicinity of the edge of the image (within a prescribed range from the edge).

2) A configuration may be adopted in which the edge portion of an image is extended by repeatedly applying pixel values of pixels in the edge portion of the image.

3) A configuration may be adopted in which the edge portion of an image is extended by randomly extracting pixel values of pixels in the vicinity of the edge of the image (within a prescribed range from the edge) and using the pixel values extracted randomly.

4) A configuration may be adopted in which the edge portion of an image is extended by calculating the average value of pixel values based on the pixel values of the entire image and using that average value.

Modified Embodiment 7

Although an input image (query image) input to the image search apparatus 30 is not specifically described in the above description, this image may be used for searching after processing that image. Examples of processing of a query image include the cropping of a partial region of interest performed by a user, and the like.

Modified Embodiment 8

A configuration may be adopted in which weighting is performed on each pixel value in a local region according to the distance from a feature point before calculating a local feature amount by the local feature amount calculation units 24 and 34. Weighting may be performed using the Gaussian function, or may be performed using the following expression.

$$v'(x, y) = \frac{\alpha + 1}{(r+1)\alpha + 1} \times v(x, y)$$

Here, $v'(x, y)$ represents a pixel value of a pixel of interest on which weighting has been performed, $v(x, y)$ represents a pixel value of the pixel of interest before weighting, and $\alpha$ represents a prescribed coefficient ($0 < \alpha < 1$).

Further, r represents the distance between the pixel of interest and a feature point in a local region, and r can be calculated using, for example, the following expression, considering the coordinates of the feature point as being $(x_0, y_0)$.

$$r = \sqrt{(x-x_0)^2 + (y-y_0)^2}$$

Modified Embodiment 9

Although the above description has been given using the case where the image registration apparatus 20 and the image search apparatus 30 implement local feature amount calculation processing as an example, the present invention is not limited to this, and a configuration may be adopted in which a single image processing apparatus implements such local feature amount calculation processing.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-114707 filed on May 18, 2010, which is hereby incorporated by reference herein in its entirety.

What is claimed is:

1. An image processing apparatus for obtaining a local feature amount from an image, comprising:
   an extension unit configured to generate an extended image by extending an edge portion of the image in a prescribed range;
   a detection unit configured to detect, from the extended image, a plurality of feature points that each indicate a setting position of a local region that specifies a calculation region for the local feature amount;
   a calculation unit configured to, for each of the feature points in the extended image, set the local region corresponding to the feature point, and calculate a local feature amount corresponding to the feature point based on image information in the local region;

an inspection unit configured to inspect the image information in each local region that has been set with respect to the extended region, and determine whether to adopt the local feature amount calculated from the local region based on the inspection result; and an obtaining unit configured to obtain each local feature amount calculated from a region other than the extended region and each local feature amount determined to be adopted by the inspection unit, as local feature amounts in the image.

2. The image processing apparatus according to claim 1, wherein the extension unit changes an extension method for extending the edge portion of the image in a local region from which the local feature amount that has been determined not to be adopted by the inspection unit is calculated and performs extension, and the inspection unit performs the determination again with respect to the local feature amount calculated by the calculation unit based on the feature point detected by the detection unit from the region that has been extended using the changed extension method.

3. An image processing apparatus for obtaining a local feature amount from an image, comprising:

a detection unit configured to detect, from the image, a plurality of feature points that each indicate a setting position of a local region that specifies a calculation region for the local feature amount;

an inspection unit configured to set the local region corresponding to each of the feature points in the image, and if the set local region protrudes from an edge of the image, inspect image information in the protruding local region, and determine whether to adopt the feature point corresponding to the local region that has been set with respect to the protruding region based on the inspection result;

an extension unit configured to extend, in a prescribed range, an edge portion of the image in the local region that has been set with respect to the feature point that has been determined to be adopted by the inspection unit; and a calculation unit configured to calculate the local feature amount corresponding to each of the feature points based on image information in a local region that does not protrude from the edge of the image and image information in the extended local region.

4. The image processing apparatus according to claim 2, wherein the inspection unit determines whether to adopt the local feature amount based on any of a variance value calculated from pixel values of pixels in the local region, a standard deviation calculated from pixel values of pixels in the local region, a coefficient obtained by performing frequency conversion on a pixel value of a pixel in the local region, a correlation between a pixel pattern in the local region and a prescribed pixel pattern, an autocorrelation of pixels in the local region, and a gradient direction histogram generated from pixel values of pixels in the local region.

5. An image processing apparatus for obtaining a local feature amount from an image, comprising:

an inspection unit configured to inspect image information in an edge portion of the image, and determine whether to extend the edge portion of the image based on the inspection result;

an extension unit configured to extend the edge portion of the image in a prescribed range if the inspection unit has determined that the edge portion is to be extended;

a detection unit configured to detect, from the image, a plurality of feature points that each indicate a setting position of a local region that specifies a calculation region for the local feature amount; and a calculation unit configured to, for each of the feature points in the image, set the local region corresponding to the feature point, and calculate the local feature amount corresponding to the feature point based on image information in the local region.

6. The image processing apparatus according to claim 5, wherein the inspection unit divides the edge portion of the image into a plurality of regions, and determines whether to extend the edge portion of the image corresponding to each of the divided regions, and the extension unit extends a region of each edge portion that has been determined to be extended.

7. The image processing apparatus according to claim 5, wherein the inspection unit determines whether to extend the edge portion of the image based on any of a variance value calculated from pixel values of pixels in the edge portion of the image, a standard deviation calculated from pixel values of pixels in the edge portion of the image, a coefficient obtained by performing frequency conversion on a pixel value of a pixel in the edge portion of the image, a correlation between a pixel pattern in the edge portion of the image and a prescribed pixel pattern, an autocorrelation of pixels in the edge portion of the image, and a gradient direction histogram generated from pixel values of pixels in the edge portion of the image.

8. The image processing apparatus according to claim 1, wherein the extension unit extends the edge portion of the image by replicating, using an edge of the image as a border, a pixel value of a pixel in a prescribed range from the edge, detecting a pixel pattern in a prescribed range from the edge of the image and repeating the detected pixel pattern, repeating a pixel value of a pixel in a prescribed range from the edge of the image, repeating a pixel value of a pixel at the edge of the image, randomly extracting a pixel value of a pixel in a prescribed range from the edge of the image and using the pixel value that has been randomly extracted, or calculating an average value of pixel values of the entire image and using the average value.

9. The image processing apparatus according to claim 1, wherein the calculation unit calculates the local feature amount after performing weighting on a pixel value of a pixel in the local region according to a distance from the feature point.

10. A processing method for an image processing apparatus for obtaining a local feature amount from an image, the method comprising:

generating an extended image by extending an edge portion of the image in a prescribed range;

detecting, from the extended image, a plurality of feature points that each indicate a setting position of a local region that specifies a calculation region for the local feature amount;

setting for each of the feature points in the extended image the local region corresponding to the feature point, and calculating a local feature amount corresponding to the feature point based on image information in the local region;

inspecting the image information in each local region that has been set with respect to the extended region, and determining whether to adopt the local feature amount calculated from the local region based on the inspection result; and obtaining each local feature amount calculated from a region other than the extended region and each local feature amount determined to be adopted in the inspecting, as local feature amounts in the image.

11. A processing method for an image processing apparatus for obtaining a local feature amount from an image, the method comprising:

inspecting image information in an edge portion of the image, and determining whether to extend the edge portion of the image based on the inspection result;

extending the edge portion of the image in a prescribed range if it is determined that the edge portion is to be extended as a result of the determination;

detecting, from the image, a plurality of feature points that each indicate a setting position of a local region that specifies a calculation region for the local feature amount; and setting for each of the feature points in the image the local region corresponding to the feature point and calculating the local feature amount corresponding to the feature point based on image information in the local region.

12. A non-transitory computer-readable storage medium storing a program for causing a computer to function as:

an extension unit configured to generate an extended image by extending an edge portion of an image in a prescribed range;

a detection unit configured to detect, from the extended image, a plurality of feature points that each indicate a setting position of a local region that specifies a calculation region for the local feature amount;

a calculation unit configured to, for each of the feature points in the extended image set the local region corresponding to the feature point, and calculate a local feature amount corresponding to the feature point based on image information in the local region;

an inspection unit configured to inspect the image information in each local region that has been set with respect to the extended region, and determine whether to adopt the local feature amount calculated from the local region based on the inspection result; and an obtaining unit configured to obtain each local feature amount calculated from a region other than the extended region and each local feature amount determined to be adopted by the inspection unit, as local feature amounts in the image.

13. A non-transitory computer-readable storage medium storing a program for causing a computer to function as:

an inspection unit configured to inspect image information in an edge portion of an image, and determine whether to extend the edge portion of the image based on the inspection result;

an extension unit configured to extend the edge portion of the image in a prescribed range if the inspection unit has determined that the edge portion is to be extended;

a detection unit configured to detect, from the image, a plurality of feature points that each indicate a setting position of a local region that specifies a calculation region for the local feature amount; and a calculation unit configured to, for each of the feature points in the image, set the local region corresponding to the feature point, and calculate the local feature amount corresponding to the feature point based on image information in the local region.

14. A processing method for an image processing apparatus for obtaining a local feature amount from an image, comprising:

detecting, from the image, a plurality of feature points that each indicate a setting position of a local region that specifies a calculation region for the local feature amount;

setting the local region corresponding to each of the feature points in the image, and if the set local region protrudes from an edge of the image, inspecting image information in the protruding local region, and determining whether to adopt the feature point corresponding to the local region that has been set with respect to the protruding region based on the inspection result;

extending, in a prescribed range, an edge portion of the image in the local region that has been set with respect to the feature point that has been determined to be adopted; and calculating the local feature amount corresponding to each of the feature points based on image information in a local region that does not protrude from the edge of the image and image information in the extended local region.

15. A non-transitory computer-readable storage medium storing a program for causing a computer to execute a processing method for an image processing apparatus for obtaining a local feature amount from an image, comprising:

detecting, from the image, a plurality of feature points that each indicate a setting position of a local region that specifies a calculation region for the local feature amount;

setting the local region corresponding to each of the feature points in the image, and if the set local region protrudes from an edge of the image, inspecting image information in the protruding local region, and determining whether to adopt the feature point corresponding to the local region that has been set with respect to the protruding region based on the inspection result;

extending, in a prescribed range, an edge portion of the image in the local region that has been set with respect to the feature point that has been determined to be adopted; and calculating the local feature amount corresponding to each of the feature points based on image information in a local region that does not protrude from the edge of the image and image information in the extended local region.

16. An image processing apparatus for obtaining a local feature amount from an image, comprising:

a detection unit configured to detect, from the image, a plurality of feature points that each indicate a setting position of a local region that specifies a calculation region for the local feature amount;

a calculation unit configured to, for each of the feature points, set the local region corresponding to the feature point, and calculate a local feature amount corresponding to the feature point based on image information in the local region;

an inspection unit configured to, on the basis of image information in an edge portion of the image, determine whether to adopt the local feature amount which can be calculated from an extended region obtained by extending the edge portion; and an obtaining unit configured to obtain each local feature amount calculated from a region other than the extended region and each local feature amount determined to be adopted by the inspection unit, as local feature amounts in the image.

17. A processing method for an image processing apparatus for obtaining a local feature amount from an image, comprising:

detecting, from the image, a plurality of feature points that each indicate a setting position of a local region that specifies a calculation region for the local feature amount;

for each of the feature points, setting the local region corresponding to the feature point, and calculating a local feature amount corresponding to the feature point based on image information in the local region;

on the basis of image information in an edge portion of the image, determining whether to adopt the local feature amount which can be calculated from an extended region obtained by extending the edge portion; and obtaining each local feature amount calculated from a region other than the extended region and each local feature amount determined to be adopted, as local feature amounts in the image.

18. A non-transitory computer-readable storage medium storing a program for causing a computer to execute a processing method for an image processing apparatus for obtaining a local feature amount from an image, comprising:

detecting, from the image, a plurality of feature points that each indicate a setting position of a local region that specifies a calculation region for the local feature amount;

for each of the feature points, setting the local region corresponding to the feature point, and calculating a local feature amount corresponding to the feature point based on image information in the local region;

on the basis of image information in an edge portion of the image, determining whether to adopt the local feature amount which can be calculated from an extended region obtained by extending the edge portion; and obtaining each local feature amount calculated from a region other than the extended region and each local feature amount determined to be adopted, as local feature amounts in the image.

\* \* \* \* \*